United States Patent [19]

Holcomb et al.

[11] Patent Number: 4,573,244
[45] Date of Patent: Mar. 4, 1986

[54] COMBINATION CONDIMENT GRINDER AND DISPENSER

[75] Inventors: David A. Holcomb; James A. Tryon, both of Seattle, Wash.

[73] Assignee: F. Bartow Fite, Seattle, Wash.

[21] Appl. No.: 738,827

[22] Filed: May 29, 1985

[51] Int. Cl.⁴ ............................................. A47J 42/34
[52] U.S. Cl. ..................................... 241/169; 241/286
[58] Field of Search ............................ 222/142.1, 510; 241/168, 169.1, 169, 169.2, 286

[56] References Cited

U.S. PATENT DOCUMENTS

| | | |
|---|---|---|
| 1,930,056 | 10/1933 | Klingler . |
| 2,045,058 | 6/1936 | Stern . |
| 2,047,566 | 7/1936 | Klingler . |
| 2,679,360 | 5/1954 | Arni . |
| 2,683,566 | 7/1954 | Bentley . |
| 2,698,719 | 1/1955 | Heard . |
| 2,876,956 | 3/1959 | Bentley . |
| 3,055,599 | 9/1962 | Cowles et al. . |
| 3,096,036 | 7/1963 | Cowles et al. . |
| 3,827,641 | 8/1974 | Andersson . |
| 4,374,574 | 2/1983 | David . |

*Primary Examiner*—Mark Rosenbaum
*Attorney, Agent, or Firm*—Seed and Berry

[57] ABSTRACT

A combination condiment grinder and dispenser mechanism (10) which can be held and operated by one hand and which includes a hand-activated lever (80) which when squeezed forces a grinding surface (88,90) in one direction against spring (92) pressure. When the hand-actuated lever (80) is released, the grinding surface (90) reverses. The grinding action thus is linear or arcuate. The upper portion of the dispenser has a salt or other condiment compartment (38) which can be sprinkled from the top thereof. Only one hand is necessary to dispense either pepper or salt or other condiment from the body of the device.

20 Claims, 17 Drawing Figures

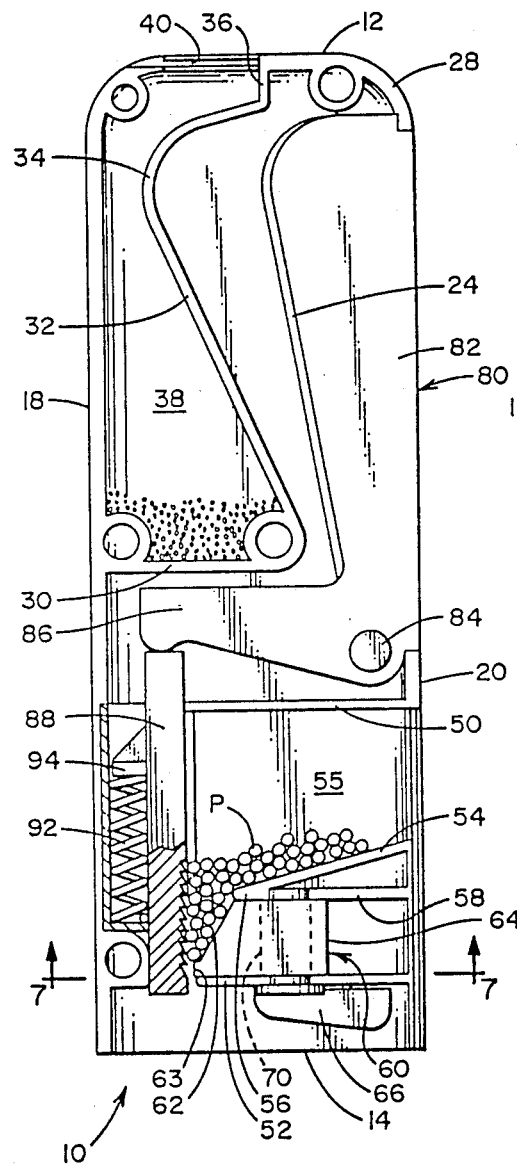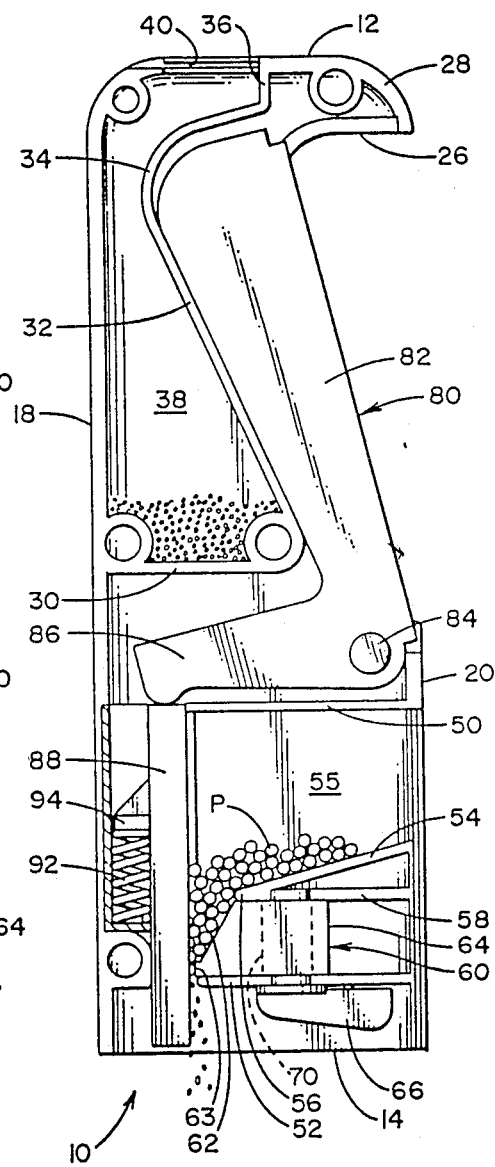

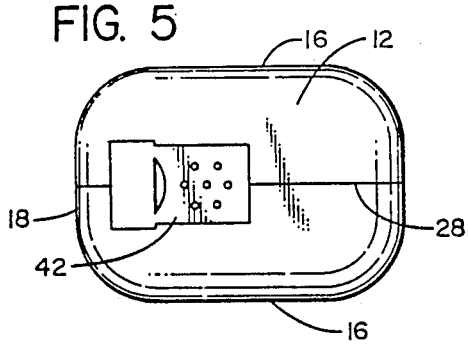
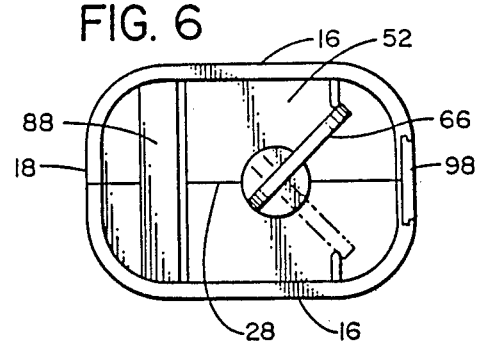
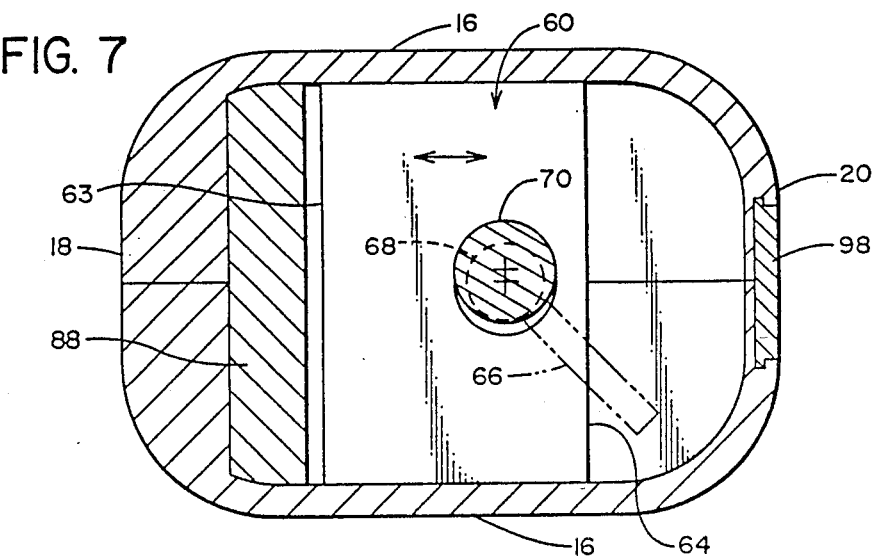
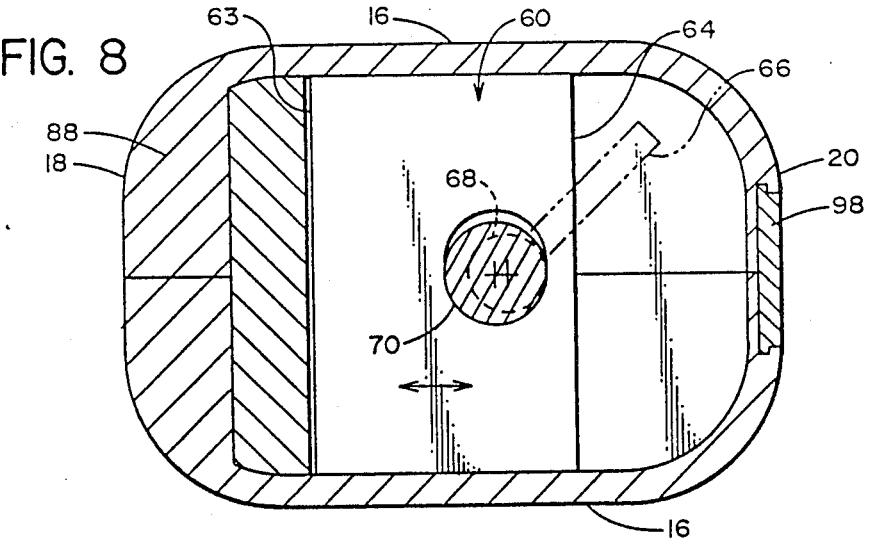

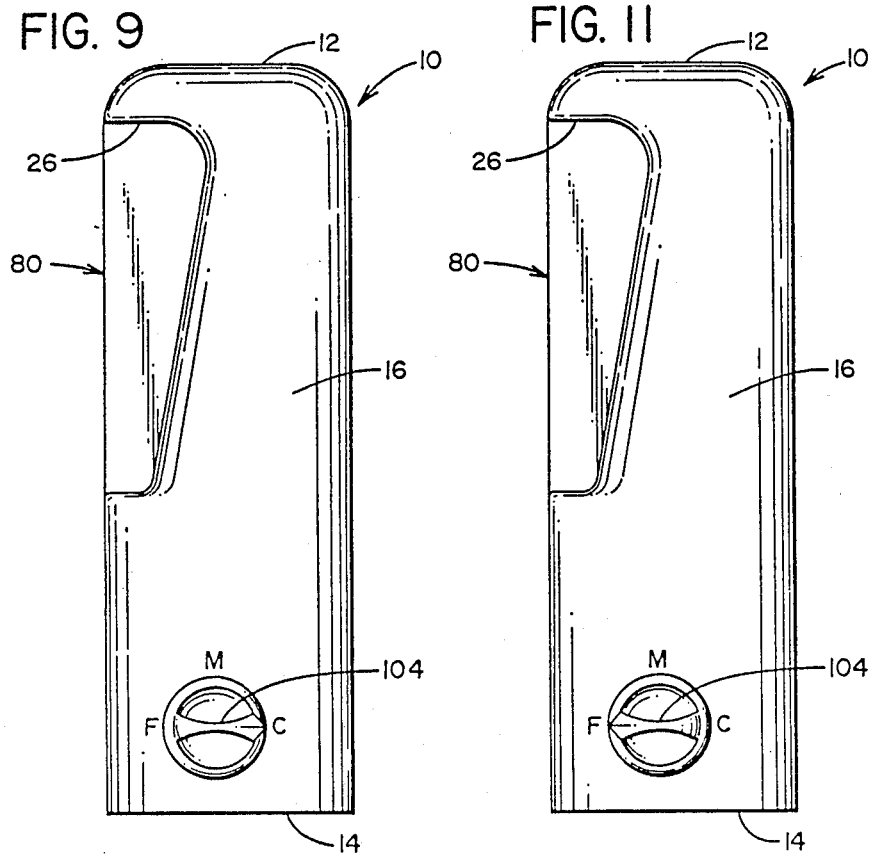

COMBINATION CONDIMENT GRINDER AND DISPENSER

TECHNICAL FIELD

The invention relates to a combination condiment grinder and dispenser apparatus and is more particularly concerned with a hand-held and hand operated grinder mechanism for peppercorns or the like and for holding another seasoning such as salt.

BACKGROUND ART

As is well known, the use of table grinders or so called peppermills intended for different types of condiments when preparing food has become increasingly popular owing to an increased interest in seasoned dishes and in spices. A common feature of most known types of table grinders is that they are intended for grinding one single variety of spice or a single mixture of spices. Hand-held and hand-operated spice or condiment grinders or peppermills generally have an elongated cylindrical housing which is asthetically configured as an attractive item of tableware. The so called spice grinders or peppermills enclose a condiment storage chamber and the grinding mechanism dispenses the ground condiments through an opening provided in the bottom. The most widely used type of spice or pepper grinders have a crank arm directly connected to the shaft of the grinding mechanism which is turned continuously and unidirectionally with one hand of the user while the other hand holds the peppermill over the food generally vertically with the ground condiment or spice dropping, out of the bottom.

Obviously, it is a distinct drawback of the crank-type grinders which are structured as indicated above that both hands are needed for operating the same. This can be inconvenient if the user wants to stir food while mixing condiment, otherwise has one hand occupied or if the user is handicapped.

There are some types of single hand operated peppermill devices which instead of being crank-types are operated by a thumb for depressing an actuating member which in turn activates a broaching function of the grinding elements within the body of the device.

U.S. Pat. Nos. 3,055,599 and 3,096,036 are both examples of the spring loaded and thumb depressed central spindle mechanism with a serrated surface for grinding peppercorns together with the cooperating tapered surface. As a result, the pulverized or ground pieces of peppercorn are dropped on through the exit aperture at the lower end of the peppermill housing.

U.S. Pat. No. 2,698,719 is a depression-type mechanism also using a cutter-type central spindle device in cooperation with cooperating tapered or conical surfaces to shape or pulverize the condiment.

U.S. Pat. No. 2,683,566 again is a variation of the thumb depressed device for grinding condiment.

U.S. Pat. No. 2,876,956 shows a structural variation but which is somewhat similar in principle also to U.S. Pat. No. 2,679,360 for activating the cooperating cutting surfaces by a centrally located spring loaded depression member.

U.S. Pat. No. 3,827,641 shows a rotary-type multipurpose grinding mill.

Finally, U.S. Pat. No. 4,374,574 shows a single hand-operated mechanism which involves a clutching mechanism for rotating one cutting or grinder surface relative to a stationary surface.

None of the above devices are similar to the instant device in terms of structure or operating principle and for that reason, are of only interest and do not anticipate the claimed subject matter herein.

DISCLOSURE OF INVENTION

The invention comprises a generally upstanding, asthetically configured body or housing which includes a hand and lever recess portion. The L-shaped lever has an upstanding or generally vertical portion in the recess and an inwardly extending actuator arm. When the user of the condiment device squeezes the housing, the lever is depressed or actuated and the inwardly extending arm forces an element having a grinding surface downwardly against spring pressure. The grinding surface, which functions linearly, cooperates with an angled surface to trap the peppercorns or condiment material to crack it and then force it down for final pulverization so that the ground materials can fall out through a gap at the lower end of the housing. An anti-dribble feature is included so that upon cessation of grinding no ground particles will continue to fall from the device. An upper chamber in the device is also provided with another condiment such as salt. An adjustment mechanism is provided to the lower end of the housing for adjusting the coarseness of the grind for the peppercorns or other condiment as desired.

Accordingly, it is among the many features of the invention that it is designed to be used and operated with one hand. The device has an adjustability feature to regulate the coarseness of the grind according to the preferences or needs of users. The device also contains a chamber for salt or other desired condiment so that two condiments used in food preparation are in the device and can be dispensed by only one hand. The device is easily and conveniently loaded both with peppercorns and with a supply of condiment for the upper surface. The mechanism for grinding is essentially quite simple and designed for long life and reliability as a commercial and home kitchen and tableware item.

BRIEF DESCRIPTION OF THE DRAWINGS

FIG. 3 is a side elevational view of one-half of the body showing additional details of construction;

FIG. 4 is the same view as side elevational view of FIG. 3 but with the operating lever pivoted so as to further illustrate the grinding action;

FIG. 5 is a top plan view of the housing or body showing the perforated opening for the condiment in the top compartment;

FIG. 6 is a bottom plan view of the housing showing the adjustment mechanism for regulating the coarseness of the condiment grinder;

FIG. 7 shows an enlarged cross-sectional view along the line 7—7 of FIG. 3 showing details of a large adjustment or for coarse grind; and FIG. 8 is a similar view as FIG. 7 showing the adjustment feature to a finer grind than in FIG. 7.

FIGS. 9 and 11 show that the grind adjustment feature may be located in the side wall rather than on the bottom;

FIGS. 10 and 12 show that the nose of the grinding block is spaced with respect to grinding surface according to type of grind desired;

BEST MODE FOR CARRYING OUT THE INVENTION

Figure 1:
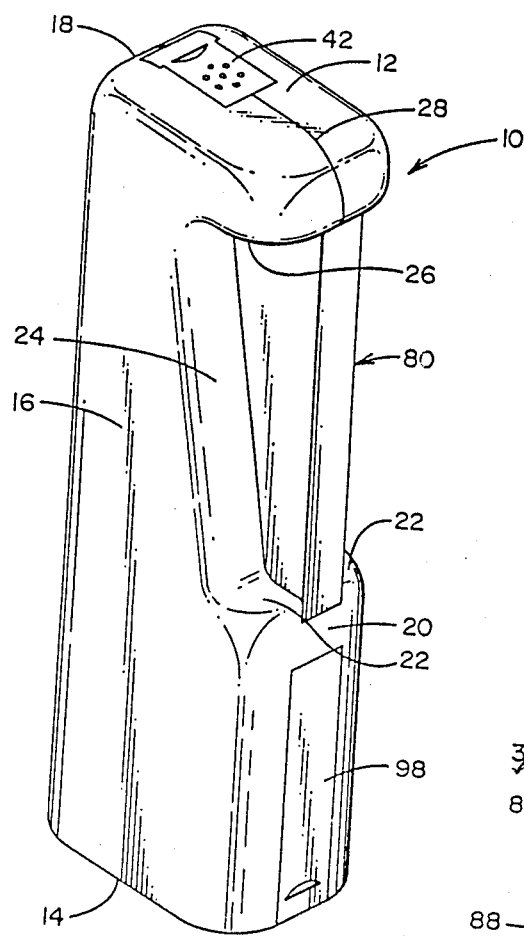
FIG. 1 is a perspective view of the condiment dispenser grinder housing showing generally its asthetic appearance from the outside.
Figure 2:
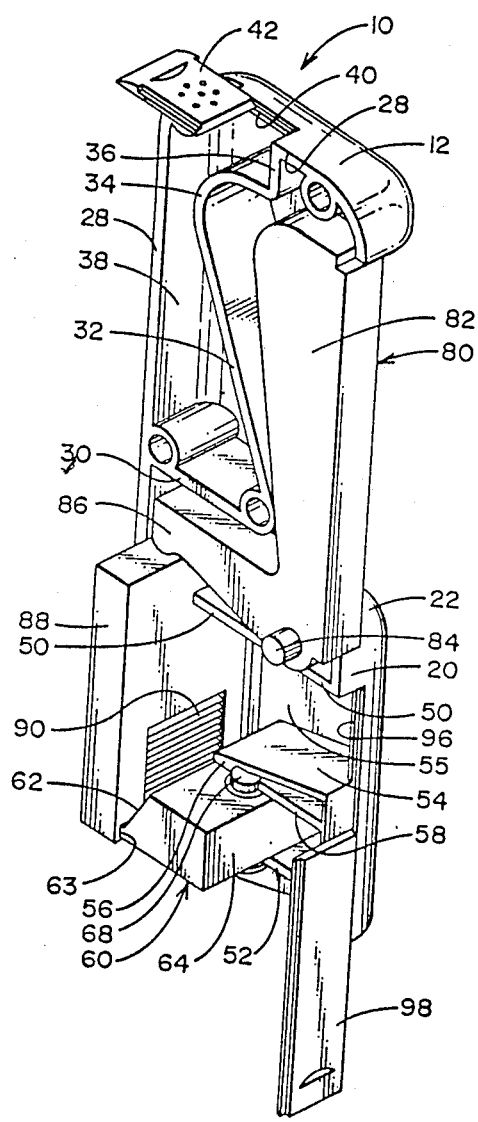
FIG. 2 is a cutaway view in perspective showing details of the internal mechanism and the condiment compartments and the general manner of function of the device.
Figure 12:
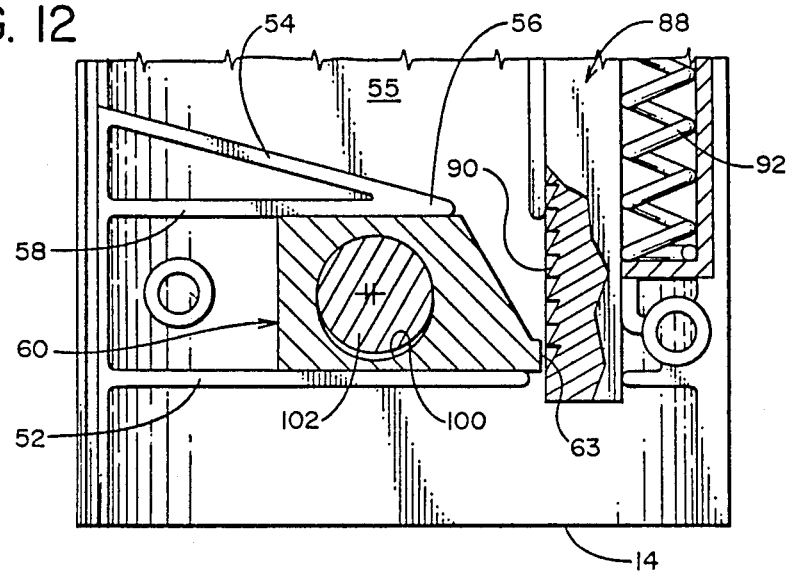

As will be seen by reference to the drawings, the invention generally designated by the number 10, has an upper end 12, a lower end 14, side surfaces 16, back surface 18 and a front surface 20. The front surface of the housing can be seen to include a lever recess area which begins approximately half-way up the front edge surface 20 and which extends inwardly generally horizontally a short distance and then angles upwardly and rearwardly. The recess is in close proximity to the top surface 12 and is roughly one-half the front to back dimension at its deepest. Recess surface 22 extends inwardly and merges with surface 24 which angles upwardly and rearwardly. The recess then extends outwardly again as surface 26 near the top surface 12 of the housing or body. It will be appreciated that the surfaces as generally described are not precisely defined by sharp corners or edges. In the interest of artistic and pleasing appearance and comfortable handling, the device is rounded at corners and along edges so that it presents an asthetically pleasing shape and configuration. The description of the recess-defining surfaces are included generally for convenience sake and to aid in description of the device.

As contemplated, the invention will be made from two matching halves which will join along a centerline 28 as can be seen in most of the views in the drawings.

The two halves of the housing in effect comprise mirror images of each other except of course for press fit pins and pin receptacles and for the adjusting knob for the grind adjustment on the side. FIGS. 1-4 will therefore be described. Besides the surfaces 22, 24 and 26 which define the lever and hand recess area in the upper portion of the body of the dispenser, each half of the plastic body includes internal wall structure of a predetermined thickness and predetermined location. While plastic has been specified, wood or light metal may also be used as the body material. The top surface 12 has its wall up to centerline 28 as described above. The two halves of the body include horizontal wall 30 which is located approximately midway down from the top of the body and which horizontal wall 30 also joins with upwardly and rearwardly extending compartment wall 32 which near the top reverse curves forwardly as wall 34 and which finally joins top surface 12 with upwardly extending wall 36. When the two halves are joined together, walls 30, 32, 34 and 36 as well as the outside walls of course are joined together to define condiment chamber 38. Chamber 38 at the top is seen to have rectangular or other shaped opening 40 with perforated slide plate 42 reciprocally movable therein so that compartment 38 can be replenished with condiment or seasoning such as salt when desired.

The lower portion of the housing, as can be seen from the figures, shows a stop wall 50 extending horizontally in from the front edge 20 of the device to approximately two-thirds the way to the rear edge surface 18 of the housing. At the bottom of the housing and recessed upwardly from the lower edge 14 is a bottom wall 52 forming the lower exterior of the device. It will be noted that a ramp wall 54 extending from the front edge 20 downwardly and rearwardly toward the back surface of the device terminates at a point 56 at a distance of slightly halfway past the vertical centerline of the dispenser body. A horizontal dividing wall 58 extends from point 56 generally horizontally forwardly to the front surface 20 as is seen in the drawings. Thus, a vertical spacing is defined between walls 52 and wall 58 for purposes which are now to be described.

Between wall 52 and wall 56 can be seen to be adjustable grinding block 60 which has a tapered ramp surface 62 upper, and lower surfaces which are in close proximity to wall 58 and wall 52 respectively, and a rear surface 64 as well as shearing edge 63. An eccentric shaft is aligned between two openings in the upper and lower walls 58 and 52 such that in one position as shown in FIG. 8 the grinding block 60 is moved rearwardly for a fine grind and may be moved toward the front edge 20 when a coarser grind is desired. A simple manipulation of the finger member 66 to turn shaft 68 which in turn moves cam 70 to move the block. Note that the shaft 68 is aligned in the openings in spaced apart walls 52 and 58. As it is turned, the cam moves the block toward or away from a slide member 88.

The mechanism includes the L-shaped lever member number 80 having generally vertical and longer arm 82 which pivots around axis 84 and which has an inwardly extending actuating arm 86. A nose portion on arm 86 engages a movable or slide member 88 having coacting grinding teeth or serrations 90 which coact with the grinder block 60, the angled surface 62 and shearing edge 63 described above. A compression spring 92 is disposed behind the slide member 88 and which slide member has an outwardly or rearwardly extending arm 94 which confines compression spring 92 such that slide bar 88 is always biased upwardly against the pressure exerted by arm 86 of lever 80.

An opening 96 is defined between the two halves in the front wall 20 so that slide cover 98 can be retracted away from the opening and a fresh supply of peppercorns or condiment inserted therein into compartment 55. The inwardly extending lever portion 86 is located between compartment wall 30 of the upper compartment and wall 50 of lower compartment 55.

Referring now to FIGS. 9-12, it will be seen that condiment grinder 10 has the grind adjustment feature mounted on the side wall rather than on the bottom. It will be noted that a shaft connected to the indicator and finger member 104 is offset with respect to eccentric 102 which moves in opening 100 in block 60. Three setting for fine, coarse and medium grinds are provided.

Figure 13:
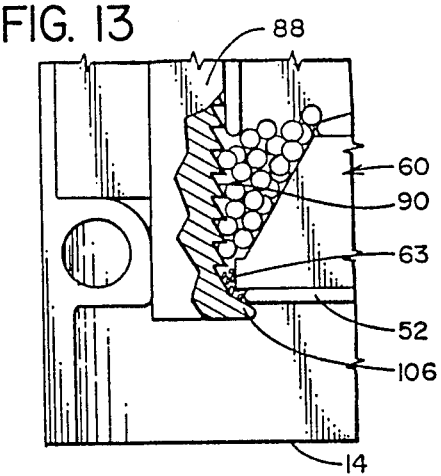
FIG. 13 shows one form of anti-dribble feature in the form of a rigid lip.

FIGS. 13 and 14A through 14D illustrate the several forms which a retainer or anti-dribble feature for fines may take. In FIG. 13, an elongated lip 106 formed along the bottom end of lever member 88 comprises a solid anti-dribble device to close off the ejection slot.

Figure 14A:
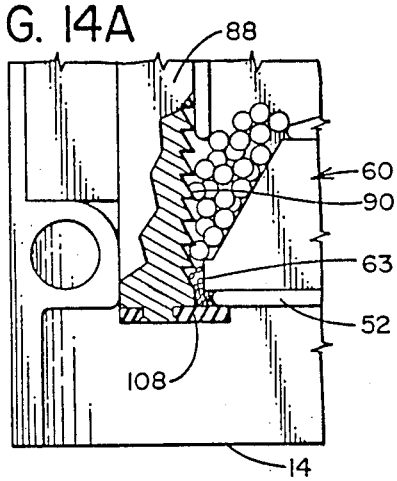
FIGS. 14A and 14B show a flexible anti-dribble device.
Figure 14B:
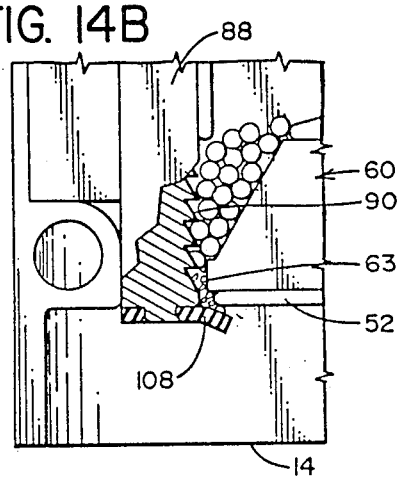

FIGS. 14A and 14B include flexible member 108 mounted in any desirable fashion on the bottom ends of member 88. The ejection slot again is closed off to prevent dribbling of fines when the grinder is not in use.

Figure 14C:
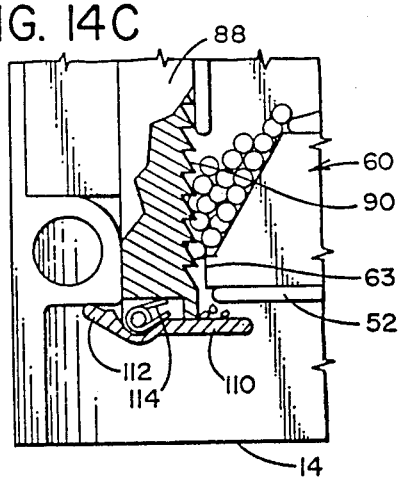
FIGS. 14C and 14D show a rotatable anti-dribble device.
Figure 14D:
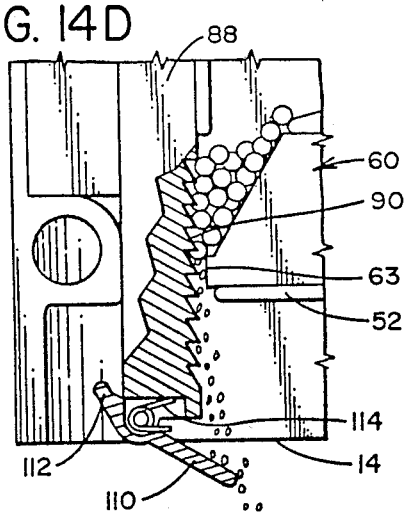

Finally, FIGS. 14C and 14D illustrate a rotatable member 110, 112 which may have spring 114 to bias part 110 outwardly. The part 112, being integral with 110, closes 110 with respect to the ejection slot when the slide 88 is up. The spring 114 biases the member 110, 112 open when the slide 88 is moved downwardly.

We claim:

1. A combination condiment grinder and dispenser device, comprising:
   (a) a housing adapted to be held and operated by one hand of the user, said housing having a top end and a bottom end on which said housing is supported and including generally in the upper portion thereof a lever recess portion defining a reduced housing area in said upper portion for being conveniently gripped by the user's hand, said recess portion including a lever opening therein for receiving an operating lever,
   (b) an operating lever disposed in said lever recess portion such that said operating lever has an outward first nonoperating position and an inward second operating position in which said operating lever is moved by squeezing action of the user's hand into said lever opening within said reduced housing area,
   (c) a first condiment compartment located in the lower portion of said housing generally below said upper recess portion for containing condiment to be ground and including an adjustable grinding block means with a shearing surface thereon, and further including a generally reciprocally moving slide member having grinding serrations thereon which coact with said grinding block for comminuting said condiment, said reciprocally moving slide member including a means for biasing the slide member to a rest position, said grinding block means and said slide member having a grind opening therebetween through which ground condiment is dispensed from said housing,
   (d) actuating lever means connected to said operating lever and included within said housing and extending from said operating lever below said lever recess portion and above said lower portion which contains said condiment compartment and into contact with said slide member for forcing said reciprocally moving slide member into operative movement when said operating lever is squeezed by said user's hand, and
   (e) adjustment means for said grinding block which provides movement of said block for adjusting the grinding action from fine to coarse.

2. The combination condiment grinder and dispenser device according to claim 1 and wherein said operating lever has an upper end and a lower end and is pivotally mounted at its lower end for limited movement by the user's hand.

3. The combination condiment grinder and dispenser device according to claim 2 and wherein said actuating lever is formed with said operating lever to form a generally "L" shaped member.

4. The combination condiment grinder and dispenser device according to claim 1 wherein the means for biasing the slide member to a rest position is a compression spring.

5. The combination condiment grinder and dispenser device according to claim 1 and wherein said upper portion of said housing includes a second condiment compartment which is fillable and dispensable through said top end of said housing.

6. The combination condiment grinder and dispenser device according to claim 1 and wherein said adjustment means includes a rotatable eccentric shaft for limited movement of said grinding block toward and away from said slide member grinding serrations.

7. The combination condiment grinder and dispenser device according to claim 1 and wherein said first condiment compartment has an access opening and cover therefore.

8. The combination condiment grinder and dispenser device according to claim 1 and wherein means are provided on the bottom of said device for closing off said grind opening when said device is not in use.

9. The grinder of claim 8, said means for closing said grinding opening including a lip on the slide member overlying the grinding opening.

10. The combination condiment grinder and dispenser device according to claim 1 wherein the shearing surface of he adjustable grinding block means contains a sloped surface, said shearing surface including a flat shelf which extends beyond said sloped surface toward and generally perpendicular to the plane of the grinding serrations of the slide member and terminating in an angled shearing edge.

11. The combination condiment grinder and dispenser device according to claim 1 wherein the adjustment means for the grinding block means provides movement of the block in a generally linear reciprocating direction toward and away from the path of movement of the grinding serrations of the slide member.

12. A combination condiment grinder and dispenser device, comprising:
   (a) a housing adapted to be held and operated by one hand of the user, said housing having a top end and a bottom end on which said housing is supported and including front and back wall surfaces and side wall surfaces and further including generally in the upper portion thereof a lever recess portion extending generally inwardly from said front wall surface and defining a reduced housing area in said upper portion for being conveniently gripped by the user's hand, said recess portion including a lever opening therein for receiving an operating lever,
   (b) an operating lever disposed in said lever recess portion such that said operating lever has an outward first nonoperating position and an inward second operating position in which said operating lever is moved by squeezing action of the user's hand into said lever opening within said reduced housing area,
   (c) a first condiment compartment located in the lower portion of said housing generally below said upper recess portion for containing condiment to be ground and including an adjustable grinding block means with a shearing surface thereon, and further including a generally vertically reciprocal slide member having grinding serrations or teeth thereon which coact with said grinding block for comminuting said condiment, said reciprocal slide member including a means for biasing the slide member upwardly, said grinding block means and said slide member having a grind opening therebetween through which ground condiment is dispensed from said housing,
   (d) actuating lever means operatively connected to said operating lever and included within said housing and extending from said operating lever below said lever recess portion and above said lower portion which contains said condiment compartment and into contact with said slide member for forcing said slide member down when said operating lever is squeezed by said user's hand, and (e) adjustment means for said grinding block which provides movement of said block for adjusting the grinding action from fine to coarse.

13. The combination condiment grinder and dispenser device according to claim 12 and wherein said operating lever has an upper end and a lower end and is pivotally mounted at its lower end for limited movement by the user's hand.

14. The combination condiment grinder and dispenser device according to claim 13 and wherein said actuating lever is integrally formed with said operating lever to form a generally "L" shaped member.

15. The combination condiment grinder and dispenser device according to claim 12 and wherein said compression spring is located with respect to said slide member such that said spring is located away from said grinding serrations.

16. The combination condiment grinder and dispenser device according to claim 12 and wherein said upper portion of said housing includes a second condiment compartment which is fillable and dispensable through said top end of said housing.

17. The combination condiment grinder and dispenser device according to claim 12 and wherein said adjustment means includes a rotatable eccentric shaft for limited movement of said grinding block toward and away from said slide member grinding serrations.

18. The combination condiment grinder and dispenser device according to claim 12 and wherein said first condiment compartment has an access opening and cover therefore.

19. The combination condiment grinder and dispenser device according to claim 12 wherein the means for biasing the slide member upwardly is a compression spring.

20. The combination condiment grinder and dispenser device according to claim 12 wherein grinding block means includes a sloped surface converging downwardly and the shearing surface of the adjustable grinding block means contains a flat shelf which extends beyond its sloped surface toward and generally perpendicular to the grinding serrations of the slide member, terminating in an angled shearing edge.

* * * * *